(12) United States Patent
Xu et al.

(10) Patent No.: US 9,665,971 B2
(45) Date of Patent: May 30, 2017

(54) TECHNIQUES FOR MULTIPLE PASS RENDERING

(71) Applicant: INTEL CORPORATION, Santa Clara, CA (US)

(72) Inventors: Xianchao Xu, Beijing (CN); Lili Gong, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/867,963

(22) Filed: Sep. 28, 2015

(65) Prior Publication Data

US 2016/0093089 A1 Mar. 31, 2016

Related U.S. Application Data (63) Continuation of application No. 13/976,449, filed as application No. PCT/US2011/064933 on Dec. 14, 2011, now Pat. No. 9,177,412.

(51) Int. Cl.
| | |
|---|---|
| *G09G 5/00* | (2006.01) |
| *G06T 15/00* | (2011.01) |
| *G09G 5/02* | (2006.01) |
| *G09G 5/36* | (2006.01) |

(52) U.S. Cl.
CPC ............ *G06T 15/005* (2013.01); *G06T 15/00* (2013.01); *G09G 5/026* (2013.01); *G09G 5/363* (2013.01); *G09G 2340/12* (2013.01); *G09G 2370/10* (2013.01)

(58) Field of Classification Search
CPC ......... G06T 1/20; G06T 15/00; G06T 15/005; G09G 2370/10; G09G 2340/12; G09G 5/363; G09G 5/026
See application file for complete search history.

(56) References Cited

U.S. PATENT DOCUMENTS

| | | | |
|---|---|---|---|
| 6,483,505 B1 | 11/2002 | Morein et al. | |
| 6,731,289 B1 * | 5/2004 | Peercy | G06F 3/1423 345/3.1 |
| 6,750,869 B1 | 6/2004 | Dawson | |
| 6,839,058 B1 | 1/2005 | Ashton | |

(Continued)

FOREIGN PATENT DOCUMENTS

| | | |
|---|---|---|
| CN | 101887595 | 11/2010 |
| CN | 1669055 | 5/2011 |
| TW | 2010/40878 | 11/2010 |

OTHER PUBLICATIONS

International Search Report and Written Opinion mailed Sep. 2012 for corresponding PCT/US2011/064933 filed Dec. 14, 2011 (nine(9) pages).

(Continued)

*Primary Examiner* — Robert Craddock
(74) *Attorney, Agent, or Firm* — Blakely, Sokoloff, Taylor & Zafman LLP (57) ABSTRACT

Techniques for multiple pass rendering include receiving vertex data for one or more objects to be enhanced. Parameters in a display list may be determined using the vertex data. Multiple pixel rendering passes may be run using the parameters in the display list. An enhanced depiction of the one or more objects may be rendered based on the multiple pixel rendering passes. Other embodiments are described and claimed.

19 Claims, 9 Drawing Sheets

(56) References Cited

U.S. PATENT DOCUMENTS

| | | | |
|---|---|---|---|
| 6,933,941 B1* | 8/2005 | Peercy | G06T 15/00 345/420 |
| 7,170,513 B1 | 1/2007 | Voorhies | |
| 2002/0140703 A1* | 10/2002 | Baker | G06T 15/04 345/582 |
| 2002/0158865 A1 | 10/2002 | Dye et al. | |
| 2003/0179220 A1* | 9/2003 | Dietrich, Jr. | G06F 8/30 345/679 |
| 2005/0243094 A1* | 11/2005 | Patel | G06T 15/005 345/506 |
| 2013/0293543 A1* | 11/2013 | Jeong | G06T 15/005 345/423 |

OTHER PUBLICATIONS

Taiwan Search Report for TW Counterpart Application No. 101146198, 1 pgs., (Mar. 10, 2015).
Chinese Search Report for CN Counterpart Application No. 201180075514.8, 2 pgs., (Apr. 22, 2016).
Interactive Order-Independent Transparency. Tech rep., NVIDIA Corporation.. Available at http:// developer.nvidia.com/object/Interactive_Order_Transparency.html, May 2001.

* cited by examiner

```
┌─────────────────────────────────────────────┐
│ RECEIVE VERTEX DATA FOR ONE OR MORE OBJECTS │
│    TO BE ENHANCED, THE VERTEX DATA RECEIVED │
│    BY A FIRST PHASE OF A THREE DIMENSIONAL  │
│                   PIPELINE                  │
│                     202                     │
└─────────────────────────────────────────────┘
                      │
                      ▼
┌─────────────────────────────────────────────┐
│  DETERMINE A DISPLAY LIST USING THE VERTEX  │
│   DATA DURING A SINGLE RUN OF THE FIRST     │
│                   PHASE                     │
│                    204                      │
└─────────────────────────────────────────────┘
                      │
                      ▼
┌─────────────────────────────────────────────┐
│   RUN MULTIPLE SECOND PHASE PIXEL RENDERING │
│           PASSES USING THE DISPLAY LIST     │
│                     206                     │
└─────────────────────────────────────────────┘
                      ▲
                      ▼
┌─────────────────────────────────────────────┐
│  RENDER AN ENHANCED DEPICTION OF THE ONE OR │
│  MORE OBJECTS BASED ON THE MULTIPLE SECOND  │
│         PHASE PIXEL RENDERING PASSES        │
│                     208                     │
└─────────────────────────────────────────────┘
```

|                      | Input: Primitive Data 520 | Input: Texture Buffer 525 | Code: Pixel shader buffer 530 | Output Depth/Render Buffer 535 |
|----------------------|---------------------------|---------------------------|-------------------------------|--------------------------------|
| 1st Run 505          | 540                       |                           | 545                           | 550                            |
| 2nd Run 510          | 540                       | 560                       | 565                           | 570                            |
| 3rd Run 515          | 540                       | 580                       | 585                           | 590                            |

TECHNIQUES FOR MULTIPLE PASS RENDERING

CROSS-REFERENCE TO RELATED APPLICATIONS

This application is a continuation of, claims the benefit of and priority to previously filed U.S. patent application Ser. No. 13/976,449 filed Jun. 26, 2013, entitled "TECHNIQUES FOR MULTIPLE PASS RENDERING", which is a U.S. national stage application of PCT/US2011/064933, filed Dec. 14, 2011, both of which are incorporated herein by reference in their entirety.

BACKGROUND

Three dimensional technology plays a crucial role in the graphics development domain. Three dimensional technology is implemented in mobile devices such as smart phones, tables and netbooks. The performance and power consumption of the three dimensional technology on the mobile devices is typically correlated to the user's visual experience and influences a product's competitive advantage.

Many three dimensional games use special effects such as, transparency, shadowing and/or adaptive textures/skins to make the games more attractive to end users. However, the applications running on current graphical processing units require many passes through the entire three dimensional pipeline on the same set of three dimensional objects in order to create these special effects.

For example, to create a transparent effect, the application has to do depth peeling first to get the frame buffer for each depth layer and then blend the layers according to the depth value. During the process of depth peeling, the application must run through the three dimensional pipeline multiple times on the same set of three dimensional objects in order to obtain the data from the different layers. During each run through the three dimensional pipeline, both the vertex phase and the pixel phase of the three dimensional pipeline is computed. However, during the runs, there is no change in the vertex phase. As a result, the vertex phase computing in these passes is duplicative and redundant. It is with respect to these and other considerations that the present improvements have been needed.

DETAILED DESCRIPTION

Various embodiments are directed to multi-pass rendering. In an embodiment, the multi-pass rendering may occur without redundantly processing vertex data. In an embodiment, vertex data for one or more objects to be enhanced may be received. In an embodiment, parameters in a display list may be determined using the vertex data. Multiple pixel rendering passes may be run using the parameters in the display list. An enhanced depiction of the one or more objects may be rendered based on the multiple pixel rendering passes.

The rendering of three dimensional effects may be improved by using the separate vertex phase and pixel phase within the three dimensional pipeline. By running the vertex phase a single time to create a display list and then reusing the display list while running the pixel phase multiple times, a three dimensional effect may be achieved with better performance and less power consumption. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
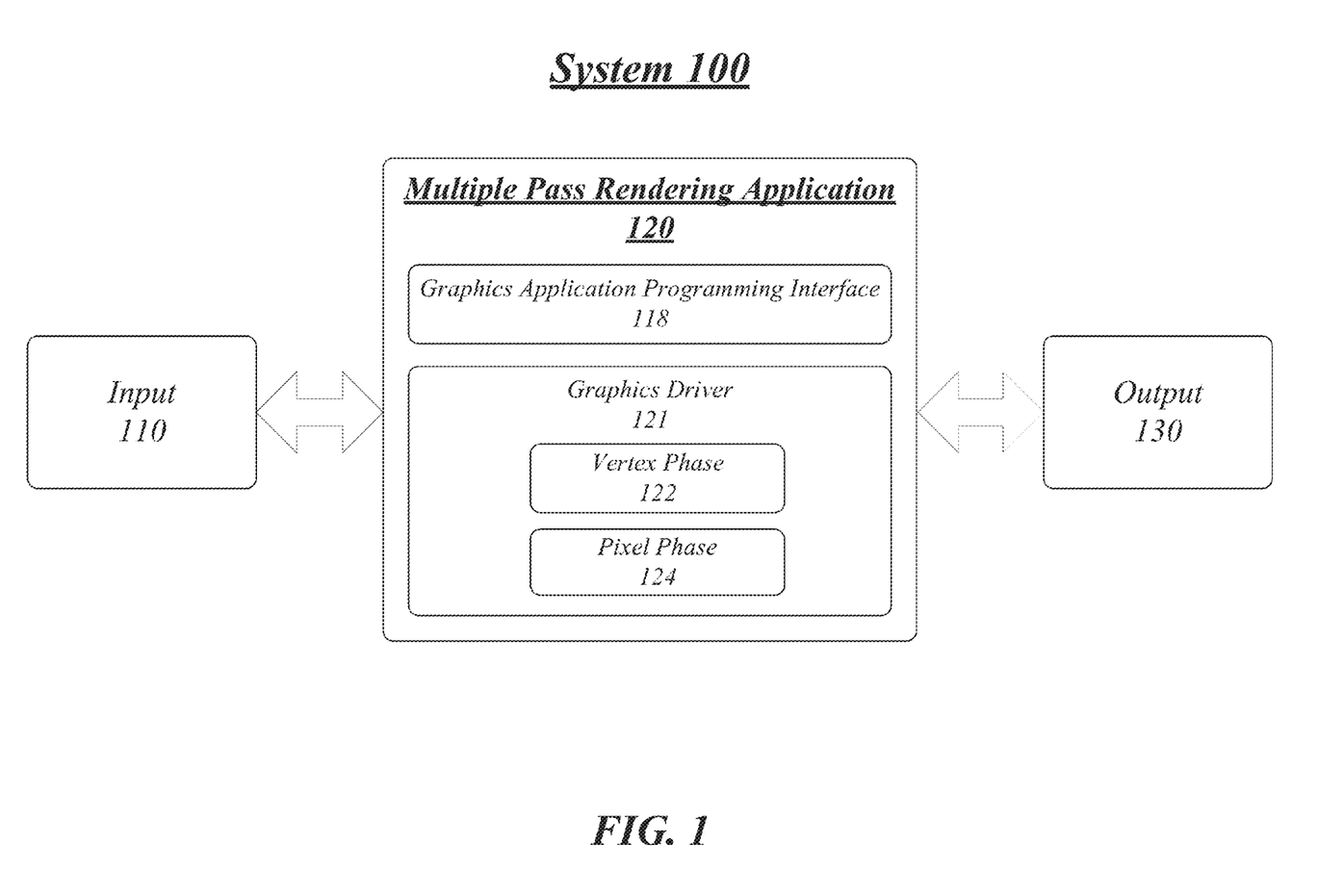
FIG. 1 illustrates an embodiment of a system for multiple pass rendering.

FIG. 1 illustrates a block diagram for a system 100. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

The system 100 may comprise the multiple pass rendering application 120. In an embodiment, the multiple pass rendering application 120 may run on a graphical processing unit. In an embodiment, the multiple pass rendering application 120 may run through a three dimensional pipeline in order to create a three dimensional special effect. For example, a multiple pass rendering application 120 may create special effects such as, but not limited to, transparency, shadowing, adaptive texture and/or adaptive skins.

In an embodiment, the system 100 may improve performance of rendering three dimensional effects by having a graphics application programming interface 118 and a graphics driver 121 within the multiple pass rendering application 120.

In an embodiment, the graphics driver 121 may be a three dimensional driver. The graphics driver 121 may work with a graphics processing unit to process the three dimensional pipeline into two separate phases. In an embodiment, the three dimensional pipeline may include a vertex phase 122 and a pixel phase 124. In an embodiment, the graphics driver 121 may run a vertex phase 122. The vertex phase 122 may be processed and an interrupt may be generated to the graphics driver 121. The graphics driver 121 may store a result of the vertex phase 122 in a display list. By storing the result in the display list, the pixel phase 426 may later use the display list for pixel processing.

In an embodiment, the graphics driver 121 may run the pixel phase 124 multiple times through the three dimensional pipeline in order to create a desired special effect. By separating the vertex phase 122 from the pixel phase 124, the vertex phase can be run a single time and the result stored. The stored result may be used during the multiple passes of the pixel phase by the pixel component 124. As a result, power is saved as the vertex component 122 does not have to be rerun each time the pixel component 124 is run in the three dimensional pipeline.

In an embodiment, the vertex phase 122 may be operative to receive vertex data based on one or more objects. In an embodiment, vertex data 110 may be input data 110 for the multiple pass rendering application 120. In an embodiment, the vertex data 110 may be data from one or more objects to which a special effect may be applied. The vertex phase 122 may run the vertex data 110 from an object through the vertex pipeline to process the data. The vertex phase 122 may determine primitive data. In an embodiment, primitive data may include one or more of transforming, lighting, color and position data.

In an embodiment, the vertex phase 122 may store the primitive data in a display list. In an embodiment, the display list may include multiple parameters. In an embodiment, the parameters for the display list may include the primitive data determined by the vertex phase using the vertex data. In an embodiment, the parameters for the display list may include pointers to command data buffers. For example, the parameters for the display list may include a pointer to a texture buffer, a pointer to a pixel shader buffer and/or a pointer to a depth/render buffer. In an embodiment, a depth/render buffer may be two separate buffers with respective depth and render information. In an embodiment, a depth buffer may include depth information. The depth information may be used to reflect an object's distance. In an embodiment, a render buffer may include a render result. In an embodiment, a render buffer may be referred to as a frame buffer.

In an embodiment, after the vertex phase 122 is finished processing, the graphics driver 121 may begin the pixel phase 124 using the parameters from the display list generated by the vertex phase 122. In an embodiment, a pixel phase 124 may be independent from the vertex phase 122. In other words, a pixel phase 124 may be run multiple times without rerunning the vertex phase 122. In an embodiment, the pixel phase 124 may be operative to run multiple pixel rendering passes using the display list. In an embodiment, a pixel rendering pass may be run for a first time to obtain a depth/render or frame buffer for a closest depth layer. In an embodiment, each pixel rendering pass may obtain a frame buffer from the next closest depth layer. In an embodiment, a pixel rendering pass may be run for a final time to obtain a frame buffer for a farthest depth layer.

In an embodiment, after the pixel phase 124 runs multiple pixel rendering passes and the furthest layer is reach by depth peeling, the pixel phase 124 may render an enhanced depiction of the one or more objects to be enhanced. In an embodiment, an enhanced depiction of the one or more objects may be the output 130 of the multiple pass rendering application 120. The output 130 may include the rendering of the one or more objects with a special effect. For example, after the depth peeling, the pixel phase 124 of the multiple pass rendering application 120 may blend the depth/render or frame buffer from the further layer to the closest layer to obtain a transparency effect for the one or more objects.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
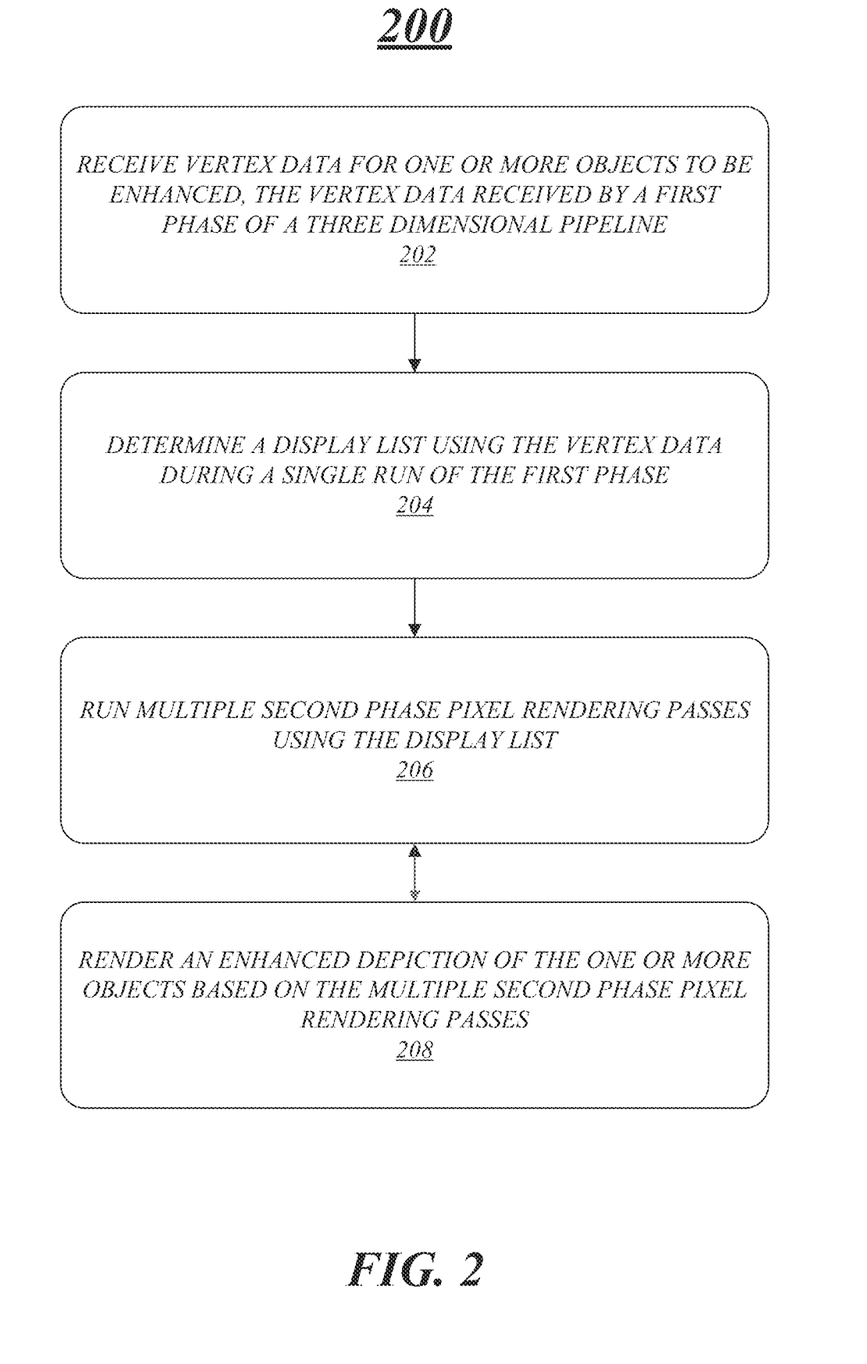
FIG. 2 illustrates an embodiment of a logic flow for the system of FIG. 1.

FIG. 2 illustrates one embodiment of a logic flow 200. The logic flow 200 may be representative of some or all of the operations executed by one or more embodiments described herein.

In the illustrated embodiment shown in FIG. 2, the logic flow 200 may receive vertex data for one or more objects to be enhanced at block 202. For example, the vertex data may be received during a first phase of a three dimensional pipeline. In an embodiment, the three dimensional pipeline may have two phases. In an embodiment, the first phase may include a vertex phase. The vertex phase may receive vertex data for one or more objects to be enhanced. For example, a user may want an object or a set of objects in a scene to appear transparent. As a result, vertex data associated with the object or set of objects in a scene may be received during the vertex phase in the three dimensional pipeline.

The logic flow 200 may determine a display list using the vertex data during a single run of the first phase at block 204. For example, the vertex data may be processed during the vertex phase. In an embodiment, the vertex data may be processed and/or compiled to determine position, color and other information regarding the vertex data. The embodiments are not limited to this example.

In an embodiment, the vertex phase may create a display list based on the processed vertex data. The display list may include one or more parameters. In an embodiment, the display list parameters may include primitive data. In an embodiment, the display list parameters may include command buffers. Command buffers may include control buffers. Command buffers may include pointers to various buffers associated with the second or pixel phase. In an embodiment, the pointers to the various buffers may be used in the pixel phase. In an embodiment, command buffers may include, but are not limited to, a pointer to a texture buffer, a pointer to a pixel shader buffer and a pointer to a depth/render buffer.

In an embodiment, the command buffers set during the vertex phase may be changed prior to the pixel phase. In an embodiment, the command buffers set during the vertex phase may be a default texture buffer, pixel shader buffer, and/or depth/render buffer. In an embodiment, a user may determine that a particular buffer should be used and the parameter may be redefined so that the pointer may point to that particular buffer. For example, if after the vertex phase was run a user specifies a particular texture buffer, the particular texture buffer can be used for the pixel phase instead of the default texture buffer to which the pointer pointed to on the display list. In an embodiment, the display list may replace the pointer to the default textual buffer with a pointer to the texture buffer chosen by a user. As the vertex phase and pixel phase are separated within the three dimensional pipeline, a user may choose one or more buffers after the vertex phase was run, but before the pixel phase is run for a first time.

The logic flow 200 may run multiple second phase pixel rendering passes using the display list at block 206. For example, the pixel phase may be run multiple times in order to achieve the desired special effect. Each time the pixel phase is run, the display list may be used without having to rerun the vertex phase. The pointers in the display list may be updated so that the pixel phase may use the information from the parameters in the display list without needing to rerun the vertex phase.

For example, the pixel phase may be run multiple times with each time removing a layer of depth from the object. The pixel phase may continue to run until the pixel phase determines that the last layer of depth has been removed from the image. The embodiments are not limited to this example.

The logic flow 200 may render an enhanced depiction of the one or more objects based on the multiple second phase pixel rendering passes at block 208. For example, by running the vertex phase a single time and using the display list generated from the vertex phase to run the pixel phase multiple times, an enhanced depiction of one or more objects may be rendered. In an embodiment, three dimensional special effects may be rendered. For example, various textures may be depicted on the one or more objects, the objects may be shown as partially or completely transparent and/or the objects may be shown with shadows. The embodiments are not limited to this example.

For example, a building may be an object in a scene to be enhanced. A user may want to make the building object appear transparent. Vertex data may be determined for the building object. The vertex data may be received by a graphical processing unit. The vertex data may be received during the vertex phase of the three dimensional pipeline. The compiled and processed vertex data may be primitive data. During a single run of the vertex phase, a display list may be determined. The display list may contain parameters, such as, but not limited to primitive data and control buffers.

The graphics processing unit may determine whether to run the pixel phase. The graphics driver may wait to run the pixel phase until a command is received. In an embodiment, a command from a user may be received to use a particular buffer to process the primitive data. The graphics processing unit may redefine and/or update the parameters in the display list based on the particular buffer. For example, the graphics processing unit may update one or more pointers in the command buffer so that a pointer points to the particular pixel shader buffer chosen by a user. This allows the pixel shader buffer specified by a user to be used in the pixel phase.

In an embodiment, multiple second phase pixel rendering passes may be run. In an embodiment, a first pixel rendering pass may remove a first layer from the building object. In an embodiment, a second pixel rendering pass may remove a second layer from the building object. Subsequent second phase pixel rendering passes may be run until the last layer of the building object is determined.

For example, an enhanced transparent image may be rendered of the building object. When multiple pixel rendering phases have been run on the building object, multiple depth/render frame buffers may be determined for the multiple depth peeling layers. In order to render a transparent object, the graphics processing unit may blend the layers using the frame buffers from furthest layer to closest layer according a depth value. A transparent image of the building object may be rendered. In an embodiment, the transparent building object may be rendered on a display of a mobile device. The embodiments are not limited to this example.

Figure 3:
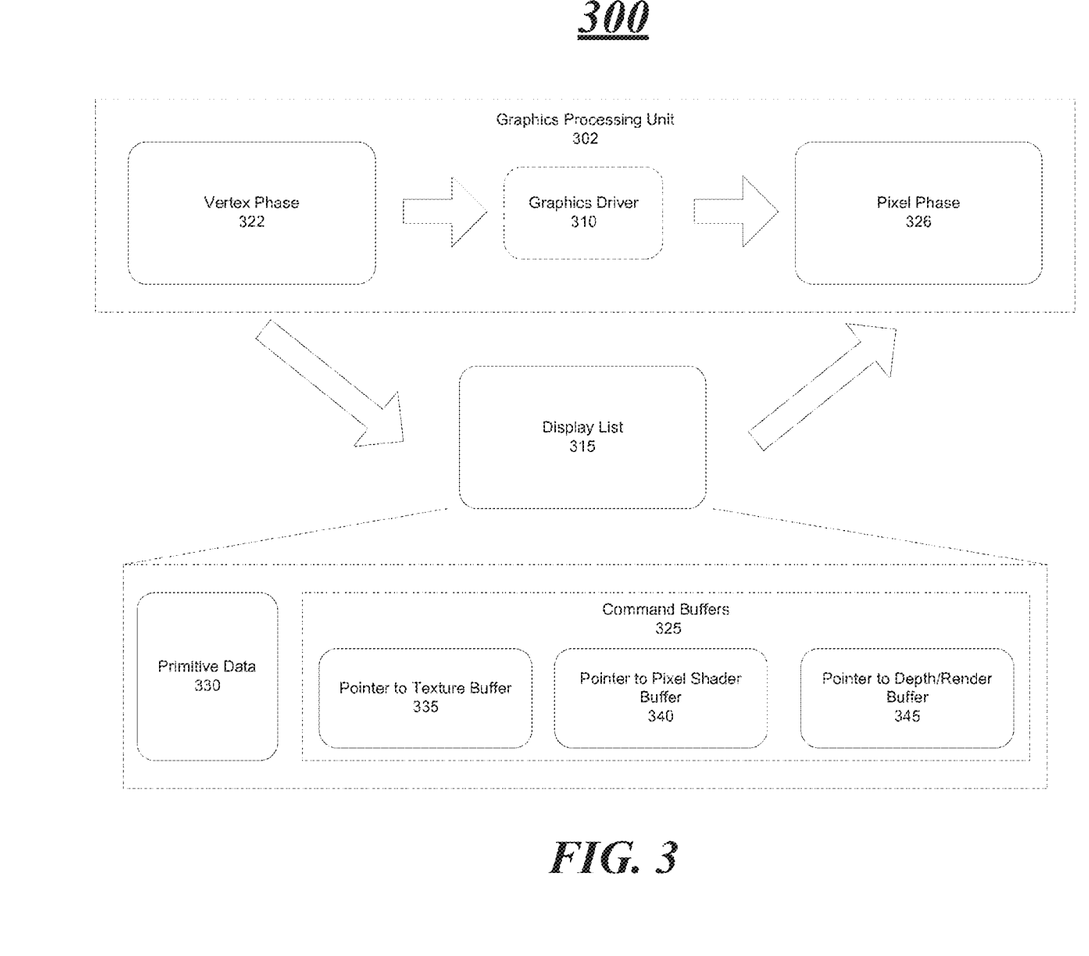
FIG. 3 illustrates an embodiment of a graphics processing unit with a three dimensional pipeline.

FIG. 3 illustrates an embodiment of a graphics processing unit with a three dimensional pipeline 300. In an embodiment, the graphics processing unit 402 may include a PowerVR graphics processing unit. In an embodiment, the graphics processing unit 301 with a three dimensional pipeline 300 may separate the three dimensional pipeline into a vertex phase 322 and a pixel phase 326 as discussed with the multiple pass rendering application 122.

In an embodiment, the graphics processing unit 302 may process the vertex phase 322 using a vertex pipeline. The graphics processing unit 322 may process the vertex phase 322 and then generate an interrupt to the graphics driver 315. The graphics driver 315 may run a vertex phase 322. The graphics driver 315 may receive an interrupt to store a result of the vertex phase 322 in an output buffer, such as, but not limited to, the display list 315. By storing the result in the display list 315, the pixel phase 326 may later use the display list 315 for pixel processing. In an embodiment, the graphics driver 315 may run the pixel phase 326.

In an embodiment, the display list 315 may include information needed for pixel processing. In an embodiment, the display list 315 may include one or more parameters. In an embodiment, the parameters in a display list 315 may include primitive data 330. In an embodiment, the primitive data 330 may include vertex data processed by the vertex phase 322. As discussed above, primitive data 330 may include one or more of transforming, lighting, color and position data.

In an embodiment, parameters in the display list 315 may include command buffers. In an embodiment, the command buffers 325 may include control stream information. In an embodiment, the command buffers 325 may include pointers to various buffers needed in the pixel phase 326 for pixel processing. For example, the command buffers 325 may include a pointer to texture buffers 335. The texture buffer may include a texture image which may be rendered for one or more objects in a scene. In an embodiment, texture coordinate information may be vertex primary attribute data. In an embodiment, texture coordinate information may be used to determine how to map a texture image onto a three dimensional object. The information in the texture buffer 335 and the primitive data 330 may be inputs for processing during the pixel phase 326.

In an embodiment, a pointer to the pixel shader buffer 340 may be included in the display list 315. The pixel shader buffer 340 may include information for processing the inputs during the pixel phase 326. In particular, the pixel shader buffer 340 may include information for processing information in the texture buffer 335 and primitive data 330. In an embodiment, the pixel shader buffer 340 may include programming code. In an embodiment, the code stored in the pixel shader buffer 340 may be loaded by the graphical processing unit 302 during the pixel phase 326.

In an embodiment, a pointer to the depth/render buffer 345 may be included in the display list 315. In an embodiment, a depth/render buffer 345 may include two separate buffers with respective depth and render information. In an embodiment, a depth buffer may include depth information. The depth information may be used to reflect an object's distance. In an embodiment, a render buffer may include a render result. In an embodiment, the depth/render buffer 345 may include the output information after the pixel shader buffer 340 processes the primitive data 330 and the texture buffer 335. In an embodiment, the depth/render buffer 345 may store the pixels at each depth layer as the pixel phase 326 runs a pixel pass removing a closest layer.

Figure 4:
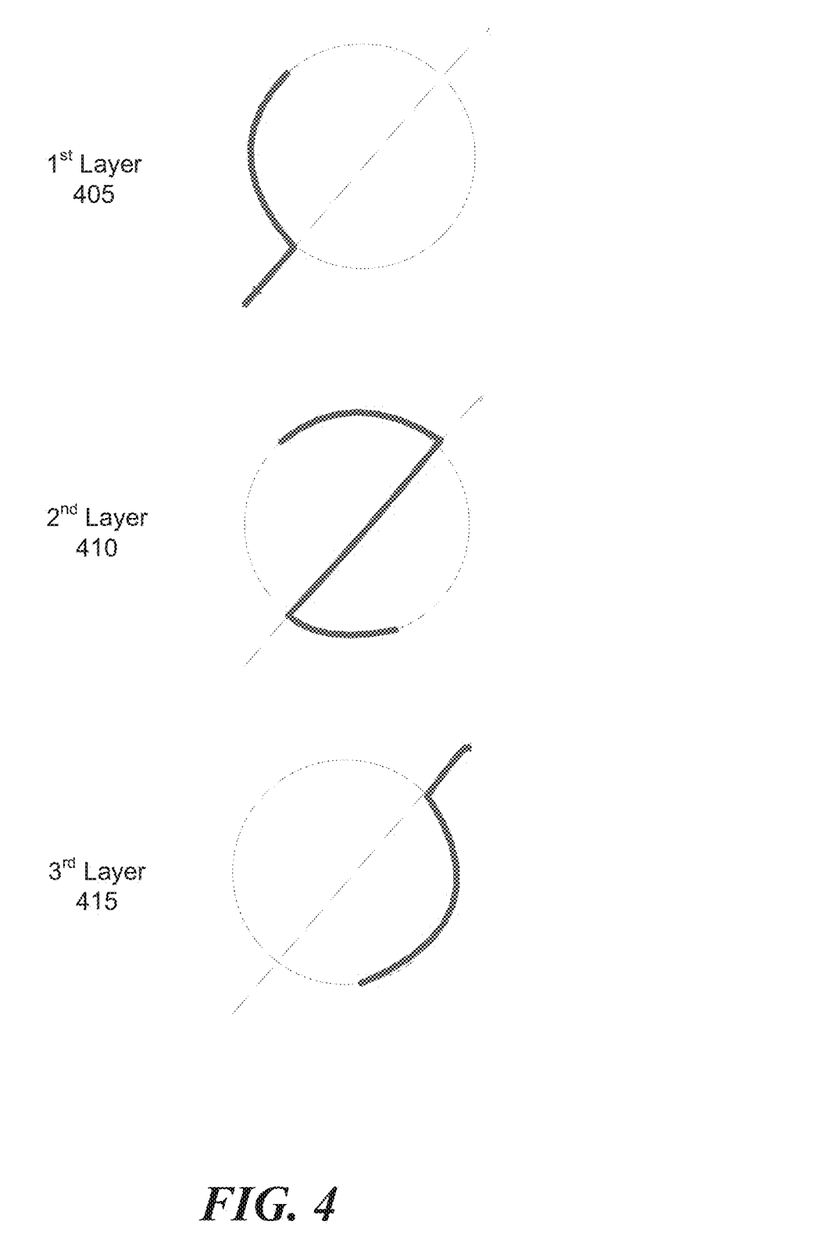
FIG. 4 illustrates an embodiment of depth rendering on an object during the pixel phase.

FIG. 4 illustrates an embodiment of depth rendering on an object during the pixel phase. In an embodiment, pixel processing may include depth peeling of layers of one or more objects. For example, the objects to which the depth peeling may be performed may be a circle with a line.

The objects may be run through the vertex phase to create a display list with multiple parameters based on the circle with a line objects. The circle and line objects may be run through a first phase in the three dimensional pipeline. The first phase may be a vertex phase. After the vertex phase is complete, the circle and line objects may be ready for the second phase in the three dimensional pipeline. The second phase may be a pixel phase for pixel processing. The pixel phase may include multiple runs of pixel rendering passes using parameters from the display list.

For example, a first pixel rendering pass may obtain a depth/render or frame buffer for a closest depth layer. As shown in FIG. 4, the first layer (layer 0) 405 may include a first pass through the pixel phase. In a first depth peeling layer 405, the closest layer may be removed.

The multiple pass rendering application 120 may determine that there are more layers to the circle and line object. As a result, the multiple pass rendering application 120 may update the pointers to the buffers from the display list and may rerun the pixel phase on the circle plus line objects. As the display list may be used for subsequent pixel passes, the vertex phase does not need to be rerun. Accordingly, the vertex phase can be run a single time and the pixel phase can be rerun to remove the various depth layers.

The second pass through the pixel phase may determine the second layer (layer 1) 410 of the circle plus line objects. The pixel phase may determine the next closest layer by using parameters from the first layer 405 and removing pixels from the first layer 405. The multiple pass rendering application 120 may remove the pixels from the first layer 405 to obtain the next closest layer 410. The next closest layer may be the second layer 410. The second phase pixel rendering pass may be run to obtain a frame buffer for a second depth layer 410.

The third pass through the pixel phase may determine the third and final layer (layer 2) 415. As the first and second layers were removed during the first two passes, the closest layer may be the third layer 415. The pixel phase may determine the next closest layer by using parameters from the second layer 410 and removing pixels from the first layer 405 and second layer 410. The multiple pass rendering application 120 may remove the pixels from the first layer 405 and second layer 410 to obtain the next closest layer 415. A pixel rendering pass may be run to obtain a frame buffer for a farthest depth layer 415. The pixel rendering pass may determine that the farthest layer 415 has been reached by running another pixel pass and determining that there are no further depth layers. In an embodiment, when the final pixel pass is run, the subsequent depth/render buffer may be the same as the previous depth/render buffer. In an embodiment, when the final pixel pass is run, there may be no pixels in the depth/render buffer. In an embodiment, when the final pixel pass is run, no further layer may exist as there may be no larger depth value to replace the existing value in depth buffer and no rendering pixels to be stored in render buffer.

Figure 5:
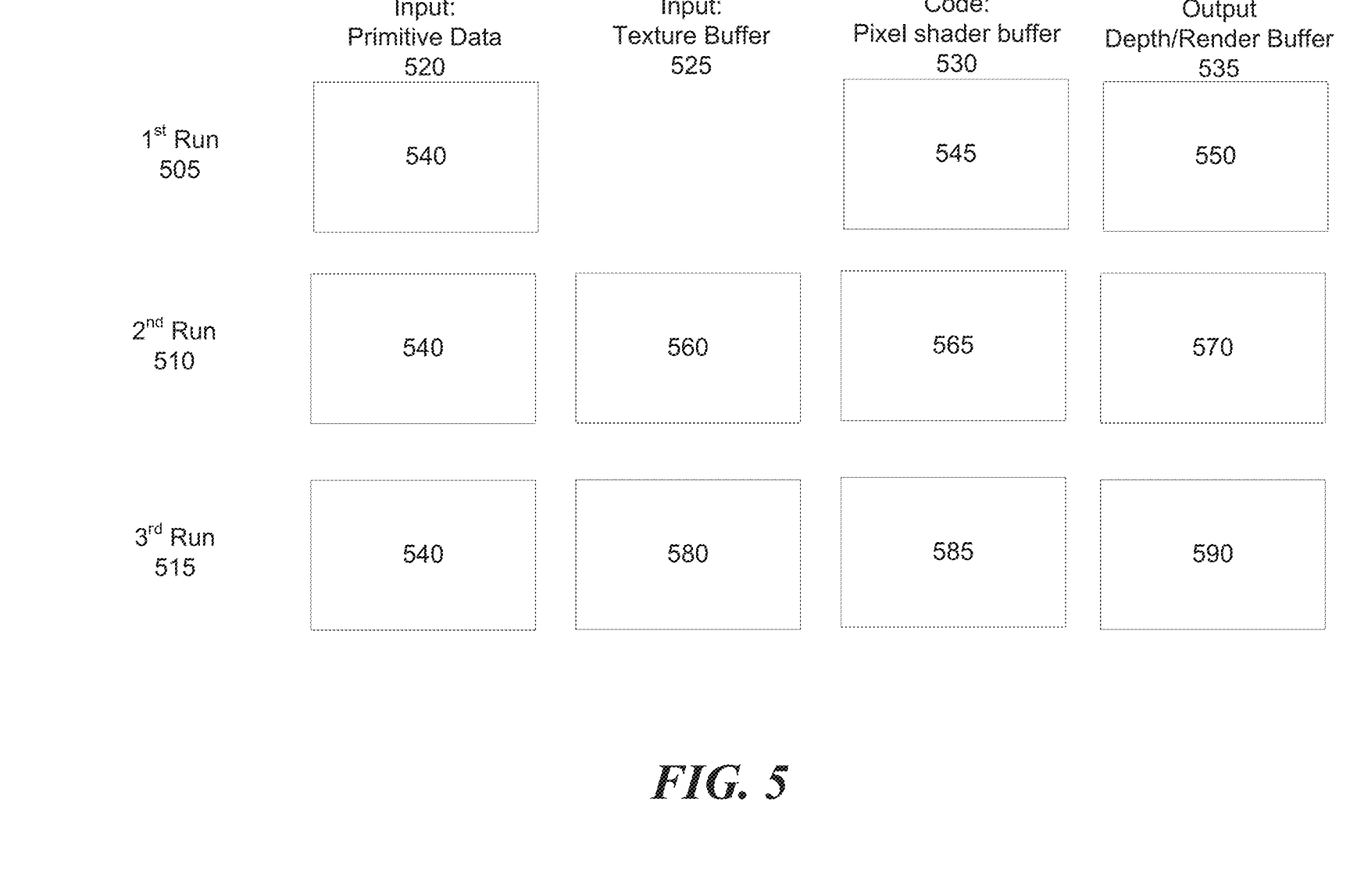
FIG. 5 illustrates an embodiment of the parameters used in the pixel phase.

FIG. 5 illustrates an embodiment of the parameters used in the pixel phase. As shown in FIG. 5, the primitive data 520 and the texture buffer 525 may be inputs. The pixel shader buffer 530 may provide the code to process the inputs. The depth/render buffer may 535 provide the output.

For example, a first run 505 through the pixel phase may use the primitive data 540 as input. The first run 505 through the pixel phase may not have any texture data from the texture buffer 525 as no comparison is needed with a previous layer. During the first run 505 through the pixel phase, the pixel shader buffer information 545 may process the primitive data and the closest layer of pixels may be placed in the depth/render buffer 550 as output.

Prior to the second run 510 of the pixel phase, the buffers may be updated. The output data from the depth/render buffer 550 may be placed in the texture buffer 560. The pixel data from the texture buffer 560 may then be used, along with the primitive data 540, as input for the second run 510 of the pixel phase. The second run 510 may use data from the pixel shader buffer 565 to process the pixel data from the texture buffer 560 and the primitive data 540. In an embodiment, the pixel shader buffer 585 may compare the primitive data 540 with the pixel data from the texture buffer 560 to determine the next layer. The result of the processing may be pixel data which may be placed in the depth/render buffer 570.

Prior to the third run 515 of the pixel phase, the buffers may be updated. The output data from the depth/render buffer 570 may be placed in the texture buffer 580. The pixel data from the texture buffer 580 may be used, along with the primitive data 540, as input for the third run 515 of the pixel phase. The third run 515 may use data from the pixel shader buffer 585 to process the pixel data from the texture buffer 580 and the primitive data 540. In an embodiment, the pixel shader buffer 585 may compare the primitive data 540 with the pixel data from the texture buffer 585 to determine the next layer. The result of the processing may be pixel data which may be placed in the depth/render buffer 590. As the pixel data in the depth/render buffer 590 may be from the final or last layer of the object, the depth peeling of the pixel phase may be complete. The embodiments are not limited to this example.

Figure 6:
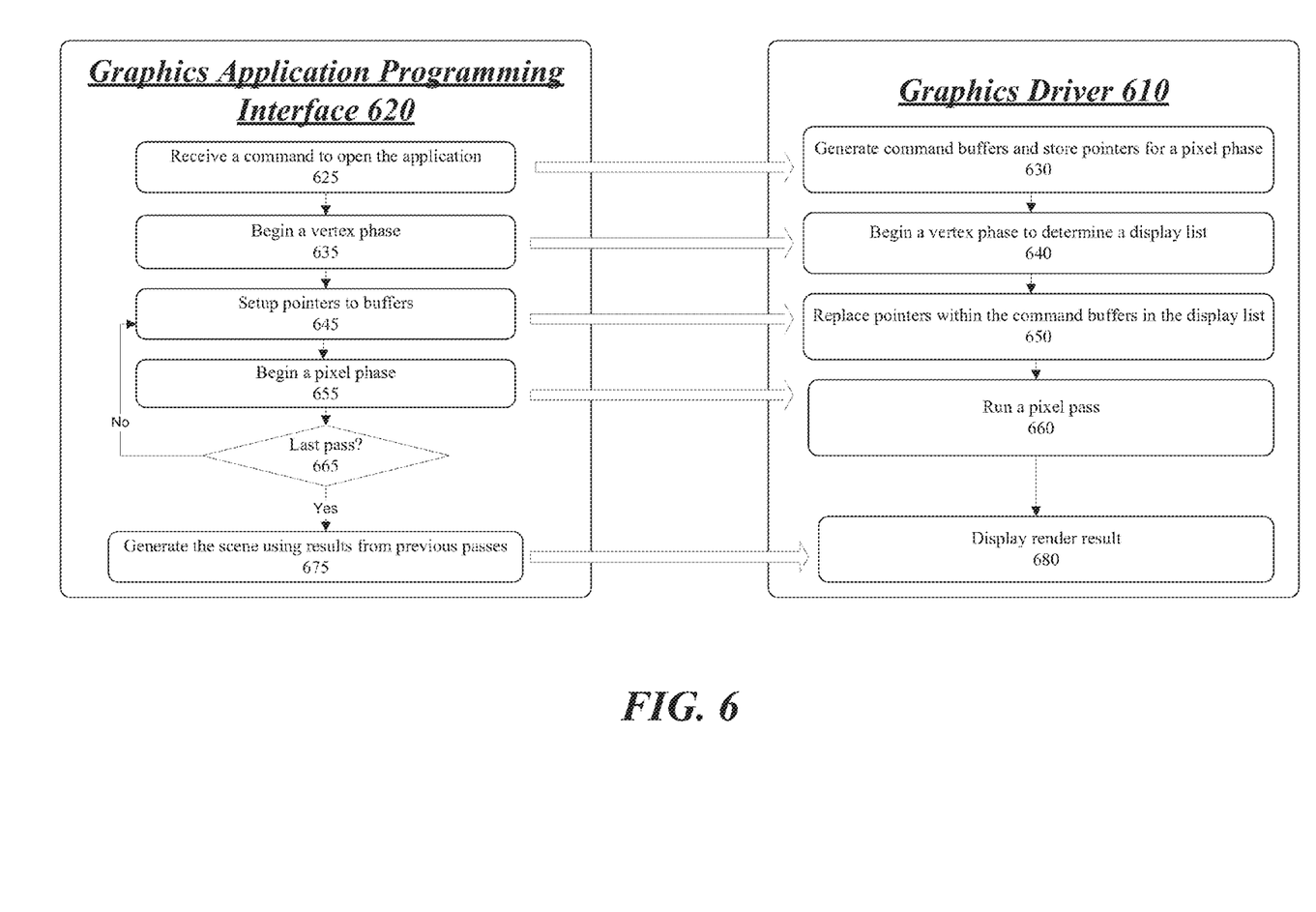
FIG. 6 illustrates an embodiment of the communication between the multiple pass rendering application and the graphics driver.

FIG. 6 illustrates an embodiment of the communication between the multiple pass rendering application and the graphics driver. In an embodiment, the multiple pass rendering application 620 may receive a command to open the application 625. In an embodiment, the command may be for a scene setup. In an embodiment, one or more objects may be rendered with a special effect for a scene.

After the multiple pass rendering application 620 receives the command to open the application, the multiple pass rendering application 620 may send information to the graphics driver 610. For example, the information sent to the graphics driver 610 may include vertex data to determine the three dimensional primitives for one or more objects in a scene. The graphics driver 610 may generate one or more command buffers and store pointers for a pixel phase 630. For example, the graphics driver 610 may prepare the command buffer. For example, the graphics driver 610 may record where the texture buffer, the pixel shader buffer and the depth/render buffer are used in the command buffer. In an embodiment, the graphics driver 610 may store pointers to the texture buffer, the pixel shader buffer and the depth/render buffer.

The multiple pass rendering application 620 may begin the vertex phase 635. The multiple pass rendering application 620 may send the information to the graphics driver 610 so that the graphics driver 610 may begin the vertex phase to determine a display list 640. The graphics driver 610 may stop processing after the vertex phase is completed. In an embodiment, the graphics driver 610 may wait for a command from the multiple pass rendering application 620 prior to beginning the pixel phase. In an embodiment, the graphics driver 610 may receive input from the multiple pass rendering application 620 that is used in the pixel phase.

In an embodiment, the multiple pass rendering application 620 may setup the texture buffer, pixel shader buffer and depth/render buffer 645. In an embodiment, a command may be received to setup the command buffers. In an embodiment, the buffers may be determined via user input into the multiple pass rendering application 620. For example, after the vertex phase, a user may determine a texture buffer to be used during the pixel phase. For example, a user may determine a pixel shader buffer to be used during the pixel phase. The embodiments are not limited to this example.

Based on the setup by the multiple pass rendering application 620, the graphics driver 610 may replace the pointers of the texture buffer, the pixel shader buffer and/or the depth/render buffer within the command buffer of the display list 650.

The multiple pass rendering application 620 may begin the pixel phase 655 by communicating with the graphics driver 610 to run a pixel pass 660. After each pixel pass 660, the pointers within the command buffer may be replaced 650. The multiple pass rendering application 620 may determine whether it is the last pass 665. If the graphics driver 610 was able to determine a new depth layer, then the graphics driver 610 may run another pixel pass 660.

When the pixel phase is finished and the last pass 665 has run 660, then the multiple pass rendering application 620 may command the graphics driver 610 to generate the final scene using the results of the previous passes 675. The graphics driver 610 may display the rendered results 680. The rendered results 680 may include a scene with a three dimensional object.

Figure 7:
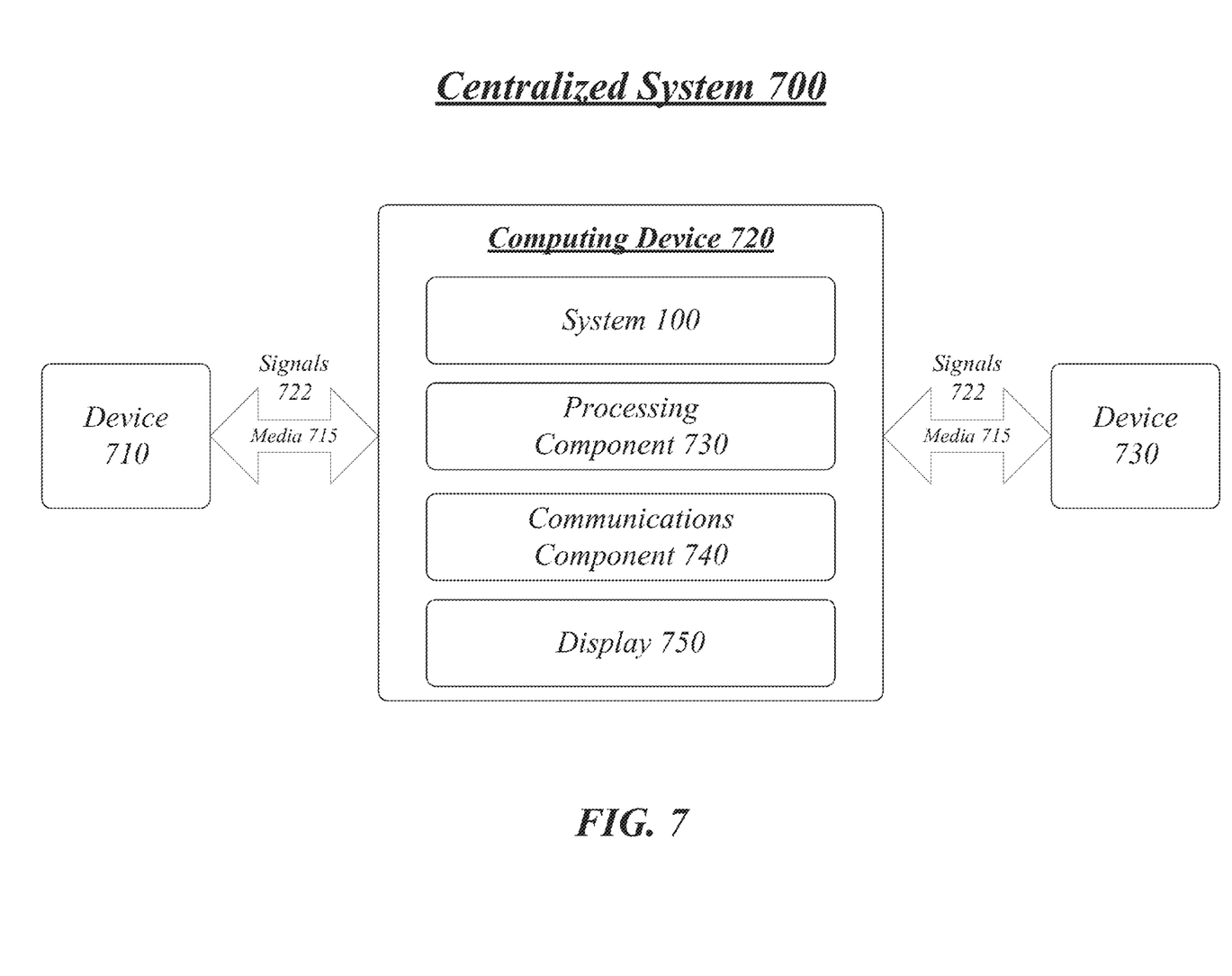
FIG. 7 illustrates an embodiment of a centralized system for the system of FIG. 1.

FIG. 7 illustrates a block diagram of a centralized system 700. The centralized system 700 may implement some or all of the structure and/or operations for the system 100 in a single computing entity, such as entirely within a single computing device 720.

In an embodiment, the computing device 720 may be a mobile device. A mobile device may include, without limitation, a computer, server, workstation, notebook computer, handheld computer, telephone, cellular telephone, personal digital assistant (PDA), combination cellular telephone and PDA, and so forth.

The computing device 720 may execute processing operations or logic for the system 100 using a processing component 730. The processing component 730 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 720 may execute communications operations or logic for the system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 720 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 720.

The computing device 720 may communicate with other devices 710, 730 over a communications media 715 using communications signals 722 via the communications component 740. In an embodiment, the computing device 720 may include, but is not limited to, smart phones, tablets, laptops, etc.

In an embodiment, computing device 720 may comprise a display 750. In one embodiment, the display 750 may comprise a liquid crystal display (LCD). In one embodiment, the display 750 may comprise an organic light emitting diode (OLED) display. In one embodiment, an OLED display may be used as it provides better color saturation and viewing angles then a liquid crystal display (LCD). In one embodiment, the display 750 may comprise one or more OLED display screens.

Figure 8:
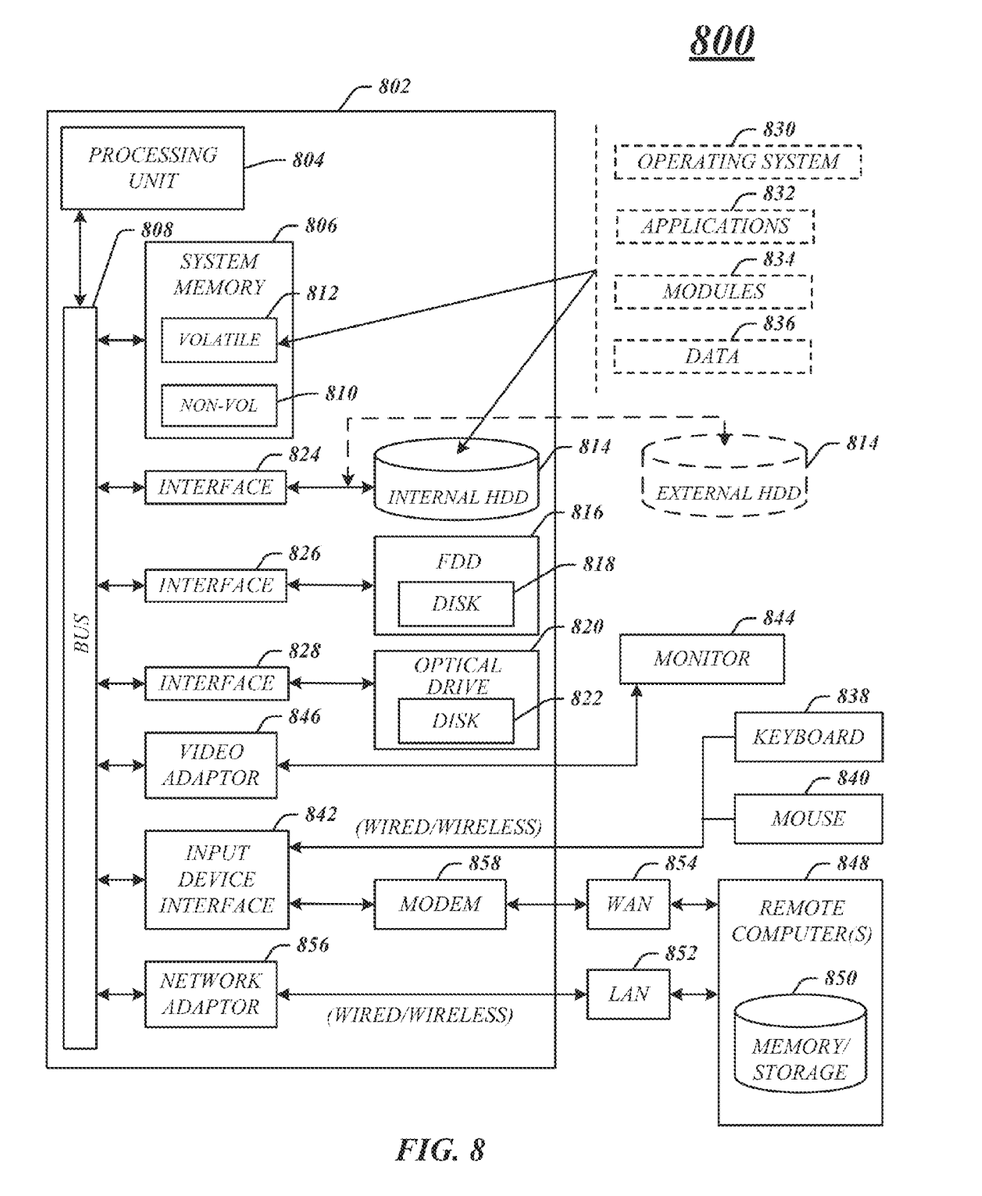
FIG. 8 illustrates an embodiment of a computing architecture.

FIG. 8 illustrates an embodiment of an exemplary computing architecture 800 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store logic. Embodiments of the invention may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

The one or more application programs 832, other program modules 834, and program data 836 can include, for example, the vertex phase 122 and the pixel phase 124.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
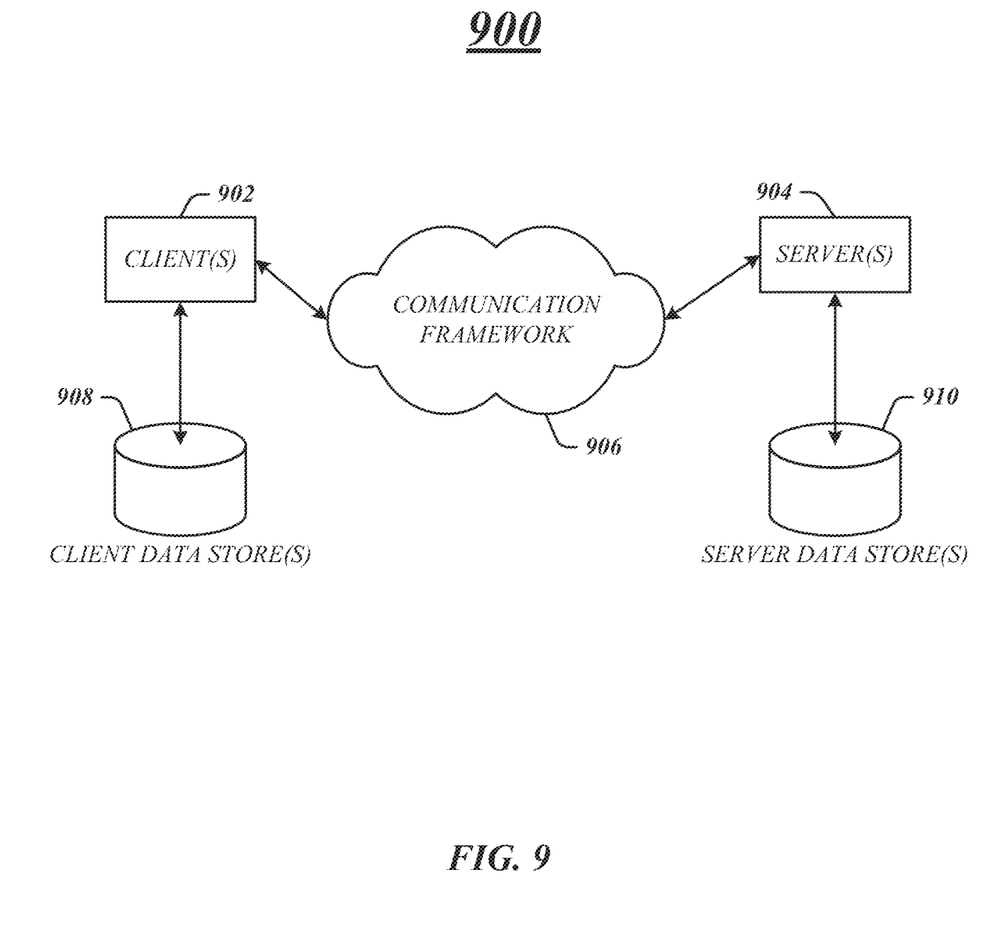
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the client systems 320. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols, such as those described with reference to system 300. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A graphics processor comprising:
 a three-dimensional (3D) graphics processing pipeline including a vertex processor and a pixel processor, the 3D graphics processing pipeline to determine, during a run of the vertex processor, a set of parameters to be used during multiple pixel rendering passes through the pixel processor, the set of parameters to be determined for a geometric object to be enhanced;

wherein the 3D graphics processing pipeline is further to render a scene including an enhanced depiction of the geometric object based on the multiple pixel rendering passes, the enhanced depiction including one or more graphical effects for the geometric object; and wherein the set of parameters for the geometric object includes pixel shader data associated with the pixel processor of the 3D graphic processing pipeline, the pixel shader data including multiple sets of pixel shader programming code to execute via the pixel processor during the multiple pixel rendering passes for the scene.

2. The graphics processor as in claim 1, wherein the one or more graphical effects includes a transparency effect.

3. The graphics processor as in claim 1, wherein the one or more graphical effects includes a shadowing effect.

4. The graphics processor as in claim 1, wherein the 3D graphics processing pipeline is to render to multiple render buffers during the multiple pixel rendering passes.

5. The graphics processor as in claim 1, wherein the 3D graphics processing pipeline is to render the scene based on the multiple render buffers.

6. The graphics processor as in claim 5, wherein the 3D graphics processing pipeline is to perform multiple pixel rendering passes through the pixel processor for one or more runs of the vertex processor.

7. The graphics processor as in claim 1, wherein the set of parameters for the geometric object includes primitive data generated based on vertex data for the geometric object.

8. The graphics processor as in claim 7, wherein the primitive data includes one or more of transform, lighting, color, and position data.

9. A system comprising:
a display device coupled to memory, the display device to display a rendered scene;
a graphics processing unit coupled to memory, the graphics processing unit including a three-dimensional (3D) graphics processing pipeline including a vertex processor and a pixel processor, the 3D graphics processing pipeline to determine a set of parameters for a geometric object using the vertex processor, perform multiple pixel rendering passes through the pixel processor using the set of parameters for the geometric object, and render a scene including an enhanced depiction of the geometric object based on the multiple pixel rendering passes, the enhanced depiction of the geometric object including one or more graphical effects; and
wherein the set of parameters for the geometric object includes pixel shader data associated with the pixel processor of the 3D graphics processing pipeline, the pixel shader data including multiple sets of programming code to execute via the pixel processor of the 3D graphics processing pipeline.

10. The system as in claim 9, wherein the one or more graphical effects include one or more of a transparency effect and a shadowing effect.

11. The system as in claim 10, additionally comprising a processing unit to provide vertex data for the geometric object to the graphics processing unit.

12. The system as in claim 11, wherein the set of parameters for the geometric object includes primitive data generated based on the vertex data.

13. The system as in claim 12, wherein the primitive data includes one or more of transform, lighting, color, and position data.

14. The system as in claim 9, wherein the 3D graphics processing pipeline is to render to multiple render buffers during the multiple pixel rendering passes for the scene.

15. The system as in claim 14, wherein the 3D graphics processing pipeline is to perform multiple pixel rendering passes through the pixel processor for one or more runs of the vertex processor.

16. A data processing system comprising:
a display device to display an object in a scene;
a system on a chip integrated circuit including a graphics processor;
a non-transitory machine-readable storage medium storing instructions which, when executed by the system on a chip integrated circuit, cause the data processing system to perform operations including:
receiving vertex data for the object;
determining a set of parameters for the object during a run of a vertex processor of a three-dimensional (3D) graphics processing pipeline of the graphics processor;
performing multiple pixel rendering passes through a pixel processor of the 3D graphics processing pipeline using the set of parameters, wherein the set of parameters includes pixel shader data associated with the pixel processor of the 3D graphics processing pipeline, the pixel shader data including multiple sets of pixel shader programming code to execute via the pixel processor the during the multiple pixel rendering passes; and
rendering an enhanced depiction of the object based on the multiple pixel rendering passes, the enhanced depiction of the object including one or more of a transparency effect and a shadowing effect.

17. The data processing system as in claim 16, the operations additionally including determining the set of parameters to be used in multiple pixel rendering passes through the pixel processor during one or more runs of the vertex processor of the three-dimensional (3D) graphics processing pipeline, the set of parameters including primitive data for the object.

18. The data processing system as in claim 17, wherein the primitive data for the object includes one or more of transform, lighting, color, and position data.

19. The data processing system as in claim 16, additionally including instructions to cause the system on a chip integrated circuit to output the enhanced depiction of the object via the display device.

* * * * *

UNITED STATES PATENT AND TRADEMARK OFFICE
CERTIFICATE OF CORRECTION

PATENT NO. : 9,665,971 B2
APPLICATION NO. : 14/867963
DATED : May 30, 2017
INVENTOR(S) : Xu et al.

Page 1 of 1

It is certified that error appears in the above-identified patent and that said Letters Patent is hereby corrected as shown below:

In the Claims

Column 15, Line 8, delete "graphic" and insert -- graphics -- in the same position.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*